(12) United States Patent
Satoh et al.

(10) Patent No.: US 7,955,179 B2
(45) Date of Patent: Jun. 7, 2011

(54) BOOT FOR UNIVERSAL JOINT

(75) Inventors: Hiroyuki Satoh, Makinohara (JP);
Kenta Yamazaki, Iwata (JP); Minoru Ishijima, Iwata (JP)

(73) Assignees: NOK Corporation, Tokyo (JP); NTN Corporation, Osaka (JP)

( * ) Notice: Subject to any disclaimer, the term of this patent is extended or adjusted under 35 U.S.C. 154(b) by 495 days.

(21) Appl. No.: 12/084,041

(22) PCT Filed: Oct. 2, 2006

(86) PCT No.: PCT/JP2006/319658
§ 371 (c)(1),
(2), (4) Date: Apr. 24, 2008

(87) PCT Pub. No.: WO2007/049429
PCT Pub. Date: May 3, 2007

(65) Prior Publication Data
US 2009/0131180 A1  May 21, 2009

(30) Foreign Application Priority Data

Oct. 25, 2005 (JP) .................................. 2005-309467

(51) Int. Cl.
*F16D 3/84* (2006.01)
(52) U.S. Cl. ........................................................ 464/175
(58) Field of Classification Search .......... 464/173–175; 277/634–636
See application file for complete search history.

(56) References Cited

U.S. PATENT DOCUMENTS 4,735,596 A * 4/1988 Ukai et al. .................... 464/175
4,923,432 A * 5/1990 Porter ........................... 464/175

FOREIGN PATENT DOCUMENTS

| JP | S59-17289 | 4/1984 |
| JP | S62-176524 | 11/1987 |
| JP | H7-16072 | 3/1995 |
| JP | 2000-266072 | 9/2000 |
| JP | 2003-049944 | 2/2003 |

OTHER PUBLICATIONS

International Search Report dated Dec. 26, 2006.

* cited by examiner

*Primary Examiner* — Greg Binda
(74) *Attorney, Agent, or Firm* — Jacobson Holman PLLC

(57) ABSTRACT

To make a bellows section of a boot to be flexibly and repeatedly deformable without deterioration in durability, to thereby reduce rotational resistance when a joint angle is large, the boot has the bellows portion where three or more circumferentially extending crest portions and root portions therebetween are alternately formed. A large-diameter attaching portion is formed at one end of the bellows portion. A small-diameter attaching portion is formed at the other end. A rising wall closest to the large-diameter attaching portion and a rising wall closest to the small-diameter attaching portion have smaller wall thickness than other portions of the bellows section. A ratio $(t_1/t_2)$ of the thickness $(t_1)$ of the rising walls to the thickness $(t_2)$ of the other portions of the bellows portion is set to $0.6 \leq t_1/t_2 < 1.0$.

4 Claims, 7 Drawing Sheets

BOOT FOR UNIVERSAL JOINT

This is a national stage of the International Application No. PCT/JP2006/319658 filed Oct. 2, 2006 and published in Japanese.

BACKGROUND OF THE INVENTION

1. Field of the Invention

The present invention relates to a boot installed to a universal joint, for example, a constant velocity joint (CVJ) or the like used in a steering wheel of a motor vehicle or the like, for sealing the universal joint.

2. Description of the Conventional Art

The constant velocity joint in the steering wheel of the motor vehicle is sealed by a boot for preventing leakage of grease in an inner portion and intrusion of muddy water or dust from an outer portion. FIG. 8 is a side view showing this kind of a boot 100 for universal joint by partly cutting it together with a constant velocity joint 200, and FIG. 9 is a cross sectional view showing a state in which the boot 100 for universal joint in FIG. 8 is deformed, together with a part of the constant velocity joint 200.

The boot 100 shown in FIG. 8 is formed by a rubber-like elastic material or the like in accordance with a blow molding, an injection molding or the like, and is constituted by a flexible bellows portion 101 in which a plurality of crest portions 101a, 101c and 101e extending in a circumferential direction and root portions 101b and 101d between them are alternately formed, a large-diameter attaching portion 102 formed at one end of the bellows portion 101, and a small-diameter attaching portion 103 formed at the other end of the bellows portion 101 (refer, for example, to Japanese Unexamined Patent Publication No. 2000-266072, and Japanese Unexamined Patent Publication No. 2003-049944).

The boot 100 is structured such that the large-diameter attaching portion 102 is fastened and fixed to an outer peripheral surface of an end portion of an outer ring 201 of the constant velocity joint 200 formed at one rotating shaft 202 side of the steering wheel by a metal fastening band 104, and the small-diameter attaching portion 103 is fastened and fixed to an outer peripheral surface of the other rotating shaft 203 of the steering wheel rotatably coupled so as to be freely displaced angularly with respect to an axis of the outer ring 201 (the rotating shaft 202) by an internal bearing mechanism of the constant velocity joint 200, by means of another metal fastening band 105.

Further, since the boot 100 is rotated with the outer ring 201 (the rotating shaft 202) and the rotating shaft 203, there is repeated such a deformation that the bellows portion 101 is extended in a half cycle of the rotation and is compressed in the other half cycle, in a state in which the rotating shaft 203 is angularly displaced with respect to the rotating shaft 202. Further, in the case that a joint angle (an angle of the rotating shaft 203 with respect to the rotating shaft 202) is high, the crest portions 101a, 101c and 101e and the root portions 101b and 101d respectively come into contact with each other in the half cycle in which the bellows portion 101 is compressed as shown in the lower half part of FIG. 9. Thus, there is a risk that a contact surface pressure is high, whereby steering torque is enlarged due to increase of rotational resistance and early abrasion is generated.

SUMMARY OF THE INVENTION

Problem to be Solved by the Invention

The present invention is made by taking the above-mentioned problem into consideration and the object of the present invention is to make it possible that the bellows portion is repeatedly deformed flexibly without deterioration in durability to thereby reduce rotational resistance in the case of the joint angle being high.

Means for Solving the Problem

As a means for effectively solving the technical problem mentioned above, in accordance with a first aspect of the present invention, there is provided a boot for a universal joint comprising:

a bellows portion in which three or more crest portions extending in a circumferential direction and root portions therebetween are alternately formed;

a large-diameter attaching portion formed at one end of the bellows portion; and a small-diameter attaching portion formed at the other end of the bellows portion, wherein at least one of a rising wall closest to the large-diameter attaching portion in the bellows portion and a rising wall closest to the small-diameter attaching portion is formed thinner than the other portions in the bellows portion.

In accordance with a second aspect of the present invention, there is provided a boot for a universal joint as recited in the first aspect, wherein a thickness ratio $t_1/t_2$ is set to $0.6 \leq t_1/t_2 \leq 1.0$, in which $t_1$ is thickness of the rising wall closest to the large-diameter attaching portion, which is relatively thin, or thickness of the rising wall closest to the small-diameter attaching portion, which is relatively thin, and $t_2$ is thickness of the other portions in the bellows portion.

In accordance with a third aspect of the present invention, there is provided a boot for a universal joint as recited in the first aspect, wherein an angle $\theta_1$ of inclination of the rising wall at the small-diameter attaching portion side of the crest portion closest to the large-diameter attaching portion is formed larger than an angle $\theta_2$ of inclination of the adjacent rising wall at the small-diameter attaching portion side, and an angle $\theta_4$ of inclination of the rising wall at the large-diameter attaching portion side of the crest portion closest to the small-diameter attaching portion is formed larger than an angle $\theta_3$ of inclination of the adjacent rising wall at the large-diameter attaching portion side.

Further, in accordance with a fourth aspect of the present invention, there is provided a boot for a universal joint as recited in the first aspect, wherein a distance $P_1$ in an axial direction between the crest portion closest to the large-diameter attaching portion and a bottom portion thereof at the large-diameter attaching portion side is formed smaller than a distance $P_2$ in an axial direction between the crest portion closest to the large-diameter attaching portion and the adjacent root portion at the small-diameter attaching portion side, and a distance $P_4$ in an axial direction between the crest portion closest to the small-diameter attaching portion and a bottom portion thereof at the small-diameter attaching portion side is formed smaller than a distance $P_3$ in an axial direction between the crest portion closest to the small-diameter attaching portion and the adjacent root portion at the large-diameter attaching portion side.

Effect of the Invention

In accordance with the boot for a universal joint on the basis of the first aspect of the present invention, even if an angle of the joint is high, the bellows portion can be deformed largely to an outer diameter side at the side of being compressed in accordance with the rotation. Further, since a rigidity of at least one of the rising wall closest to the large-diameter attaching portion in the bellows portion and the rising wall closest to the small-diameter attaching portion is small, an increase of contact force between the crest portions and between the root portions is restricted and an increase of rotational resistance in a steering operation is restricted, even if the crest portions and the root portions respectively come into contact with each other in accordance with the rotation.

In accordance with the boot for a universal joint on the basis of the second aspect of the present invention, it is possible to reduce the rotational resistance without lowering the durability, and it is possible to restrict the increase of the contact force between the crest portions and between the root portions.

In accordance with the boot for a universal joint on the basis of the third and fourth aspects of the present invention, since a start of the contact between the crest portions and between the root portions at the compression side of the bellows portion in accordance with the rotation is delayed, that is, a contact start angle is enlarged, it is possible to restrict the increase of the contact force, and it is restrict to suppress the increase of the rotational resistance in a steering.

DETAILED DESCRIPTION OF PREFERRED EMBODIMENTS

Figure 1:
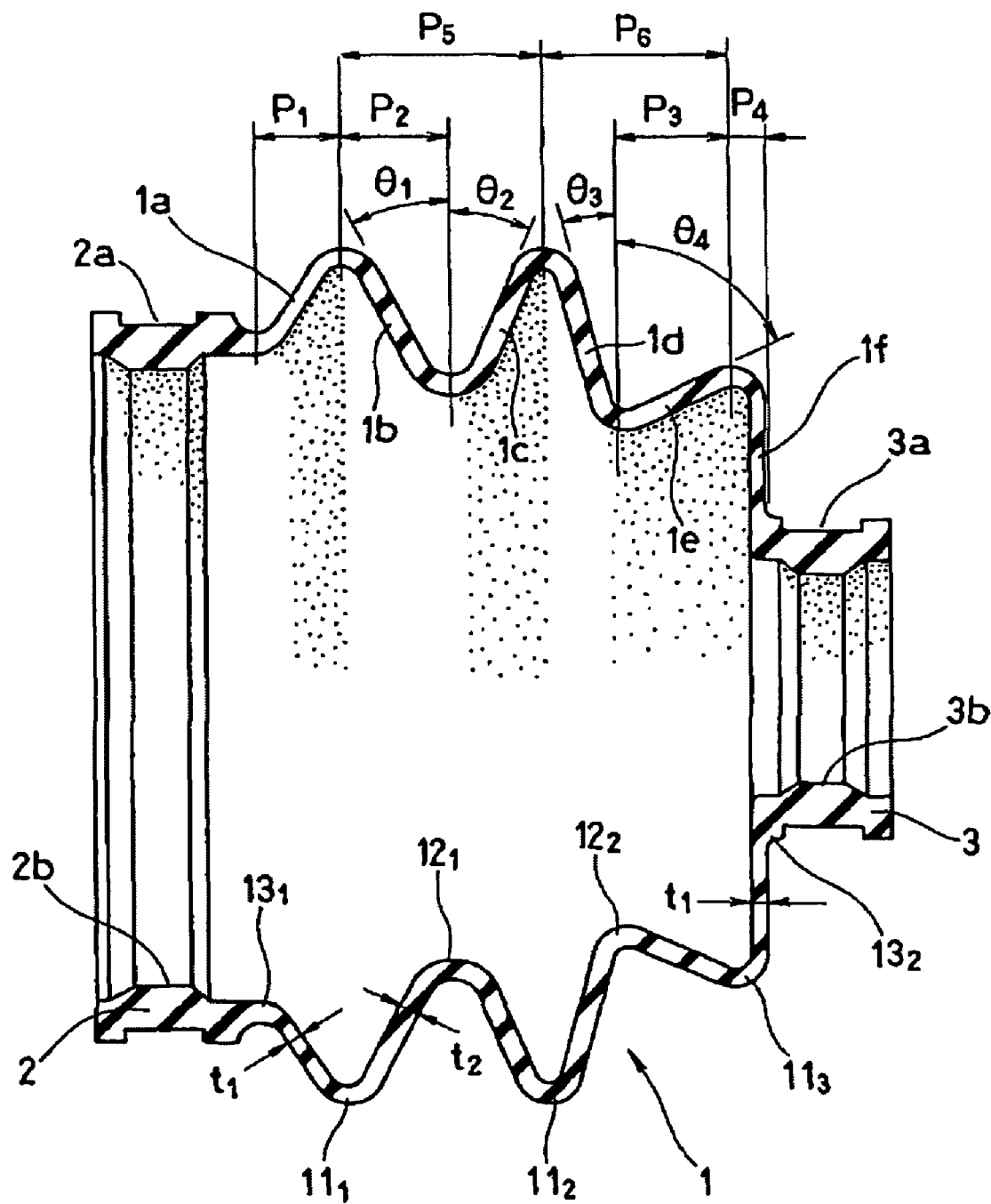
FIG. 1 is a side view showing a boot for a universal joint in accordance with a preferable first embodiment of the present invention together with a constant velocity joint 2 in a partly cutting manner.

A description will be given below of preferable embodiments of a boot for a universal joint in accordance with the present invention with reference to the accompanying drawings. FIG. 1 is a cross sectional view showing a boot for a universal joint in accordance with a first embodiment.

A boot shown in FIG. 1 is formed by a rubber-like elastic material or a synthetic resin having a flexibility in accordance with a blow molding, an injection molding or the like, and is basically constituted by a flexible bellows portion 1 in which three crest portions $11_1$, $11_2$ and $11_3$ extending in a circumferential direction and two root portions $12_1$ and $12_2$ therebetween are alternately formed, a large-diameter attaching portion 2 formed at one end of the bellows portion 1, and a small-diameter attaching portion formed at the other end of the bellows portion 1, in the same manner as the conventional structure described above.

A band attaching groove 2a which is continuous in a circumferential direction for attaching a metal fastening band is formed on an outer peripheral surface of the large-diameter attaching portion 2, and a fitting protruding stripe 2b which is continuous in the circumferential direction is formed in an inner peripheral surface. Further, in the same manner, a band attaching groove 3a which is continuous in the circumferential direction for attaching another metal fastening band is formed on an outer peripheral surface of the small-diameter attaching portion 3, and a fitting protruding stripe 3b which is continuous in the circumferential direction is formed on the inner peripheral surface.

Thickness $t_1$ of a rising wall 1a closest to the large-diameter attaching portion 2 in the bellows portion 1 and a rising wall 1f closest to the small-diameter attaching portion 3 is, for example, 1.2 mm, and thickness $t_2$ of the other portion (root portions $12_1$ and $12_2$ and rising walls 1b to 1e constructing inclined surfaces at both sides of the root portions $12_1$ and $12_2$) in the bellows portion 1 is, for example, 1.5 mm. Accordingly, a relation $t_1<t_2$ is established. Further, in accordance with test results mentioned below, it is preferable to set a ratio (a thickness ratio) $t_1/t_2$ between $t_1$ and $t_2$ is set to $0.6 \leq t_1/t_2 < 1.0$.

Further, an angle $\theta_1$ of inclination of the rising wall 1b at the small-diameter attaching portion 3 side of a first crest portion $11_1$ closest to the large-diameter attaching portion 2 is formed larger than an angle $\theta_2$ of inclination of the rising wall 1c which is adjacent at the small-diameter attaching portion 3 side beyond the root portion $12_1$ ($\theta_1>\theta_2$), and an angle $\theta_4$ of inclination of the rising wall 1e at the large-diameter attaching portion 2 side of a third crest portion $11_3$ closest to the small-diameter attaching portion 3 is formed larger than an angle $\theta_3$ of inclination of the rising wall 1d which is adjacent at the large-diameter attaching portion 2 side beyond a root portion $12_2$ ($\theta_3<\theta_4$). In this case, the angles $\theta_1$ to $\theta_4$ of inclination correspond to angles of inclination with respect to planes which orthogonally intersect an axis.

Further, a pitch $P_1$ in an axial direction between the first crest portion $11_1$ and a bottom portion $13_1$ at the large-diameter attaching portion 2 side is formed smaller than a pitch $P_2$ in an axial direction between the first crest portion $11_1$ and the adjacent root portion $12_1$ at the small-diameter attaching portion 3 side, and a pitch $P_4$ in an axial direction between the third crest portion $11_3$ and a bottom portion $13_2$ at the small-diameter attaching portion 3 side is formed smaller than a pitch $P_3$ in an axial direction between the third crest portion $11_3$ and the adjacent root portion $12_2$ at the large-diameter attaching portion 2 side.

Figure 8:
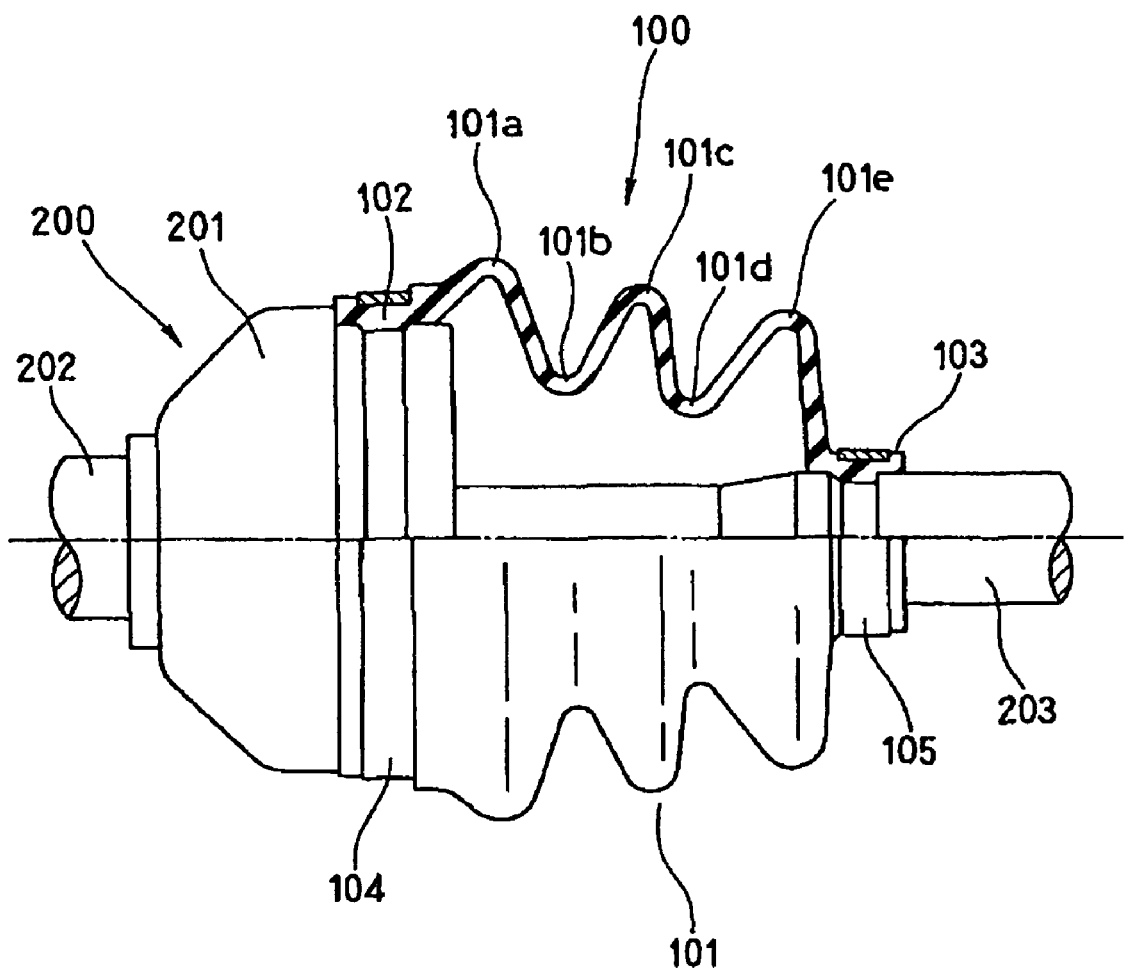
FIG. 8 is a side view showing a conventional boot 100 for a universal joint together with a constant velocity joint 200 in a partly cutting manner.
Figure 9:
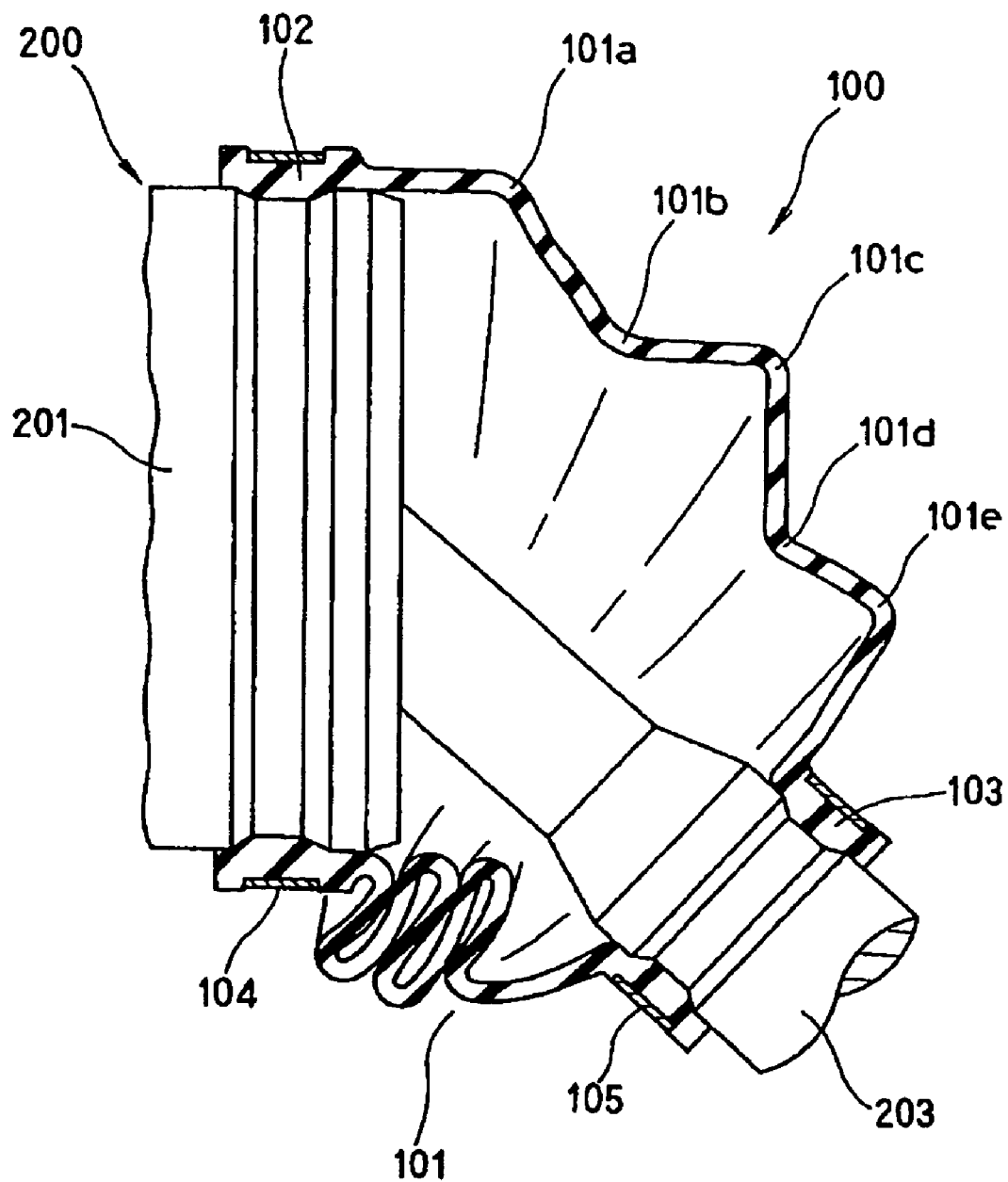
FIG. 9 is a cross sectional view showing a state in which the boot 100 for the universal joint is deformed in FIG. 8, together with a part of the constant velocity joint 200.

In the boot provided with the structure mentioned above, in the same manner as the prior art in FIG. 8 described above, the large-diameter attaching portion 2 is fastened and fixed to the forming portion of the fitting groove on the outer peripheral surface of the outer ring of the constant velocity joint by a fastening band, and the small-diameter attaching portion 3 is fastened and fixed to the forming portion of the fitting groove on an outer peripheral surface of a rotating shaft of a steering wheel by another fastening band, whereby it is possible to prevent foreign matters from making an intrusion into an internal bearing mechanism of the constant velocity joint from an external portion, and it is possible to prevent lubricating grease or the like filled in the bearing mechanism from leaking to an outer portion.

Further, since the boot is rotated together with the outer ring or the constant velocity joint and the rotating shaft in accordance with the operation of the steering wheel, there is repeated such a deformation that the bellows portion 1 is extended in a half cycle of the rotation and is compressed in the other half cycle in accordance with a joint angle.

Further, in accordance with this aspect, since the thickness $t_1$ of the rising wall 1a closest to the large-diameter attaching portion 2 in the bellows portion 1 and the rising wall 1f closest to the small-diameter attaching portion 3 is thinner than the thickness $t_2$ of the other portions (the root portions $12_1$ and $12_2$ and the rising walls 1b to 1e constructing the inclined surfaces at both sides of the root portions $12_1$ and $12_2$) in the bellows portion 1, the bellows portion 1 can be deformed largely to the outer diameter side, at the side where the bellows portion 1 is compressed in accordance with the rotation, even if the joint angle is high. Further, since the thickness $t_1$ of the rising walls 1a and 1f is small, whereby the rigidity thereof is small, the increase of the contact force between the crest portions $11_1$ to $11_3$ and between the root portions $12_1$ and $12_2$ can be restricted even if the crest portions $11_1$ to $11_3$ and the root portions $12_1$ and $12_2$ come into contact with each other at the side where the bellows portion 1 is compressed in accordance with the rotation. As a result, the increase of the rotational resistance in the steering operation can be restricted.

Further, since the relation $\theta_1 > \theta_2$ and $\theta_3 < \theta_4$ is established, the rising walls 1b and 1e rising while sandwiching the root portions $12_1$ and $12_2$ at both sides of the intermediate second crest portion $11_2$ are formed in such a shape as to incline more largely to the axial direction than the rising walls 1c and 1d of the second crest portion $11_2$. Accordingly, the second crest portion $11_2$ tends to be readily folded in the half cycle in which the bellows portion 1 is compressed in accordance with the rotation. Further, since the crest of the first crest portion 1 is unevenly positioned at the large-diameter attaching portion 2 side due to the relation $P_1 < P_2$, and the crest of the third crest portion $11_3$ is unevenly positioned at the small-diameter attaching portion 3 side due to the relation $P_3 > P_4$, it is possible to set a pitch $P_5$ between the first crest portion $11_1$ and the second crest portion $11_2$ and a pitch $P_6$ between the second crest portion $11_2$ and the third crest portion $11_3$ comparatively large in the limited size of the boot.

Accordingly, at the side where the bellows portion 1 is compressed at a time of enlarging the joint angle, such a deformation that the second crest portion $11_2$ is folded is first started, the pitches $P_5$ and $P_6$ between the second crest portion $11_2$, and the first crest portion $11_1$ and the third crest portion $11_3$ are then narrowed, and the crest portions $11_1$ to $11_3$ and the root portions $12_1$ and $12_2$ are respectively brought into contact with each other. Therefore, it is possible to delay the contact start at the compression side of the bellows portion 1 (enlarge the contact start angle). In other words, the increase of the contact force can be thereby restricted, and the increase of the rotational resistance in the steering operation can be restricted.

In this case, in the first embodiment mentioned above, both of the rising wall 1a closest to the large-diameter attaching portion 2 in the bellows portion 1 and the rising wall 1f closest to the small-diameter attaching portion 3 are formed thinner than the other portions in the bellows portion 1, however, only one of the rising walls may be formed thinner than the other portions.

Figure 2:
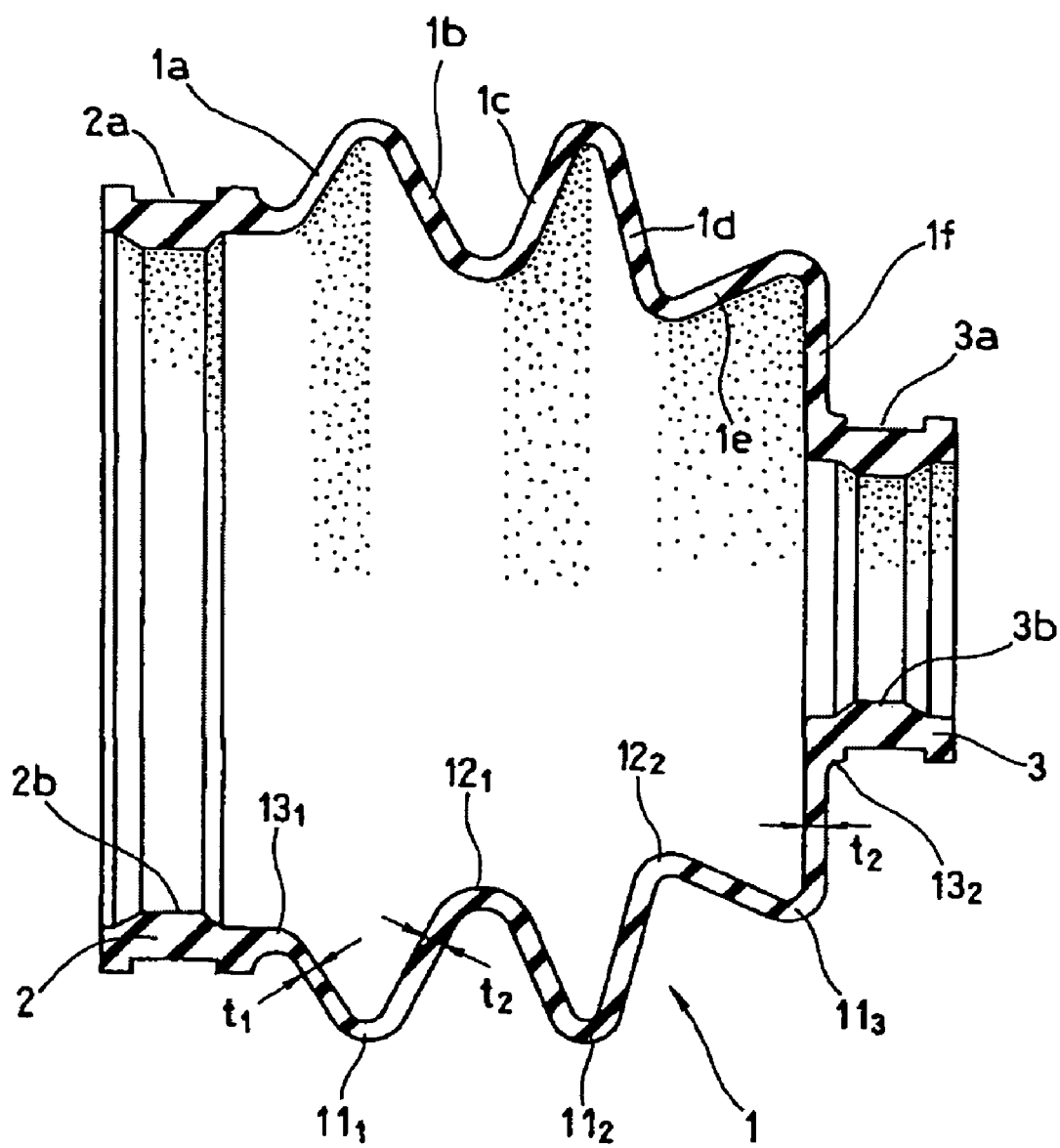
FIG. 2 is a side view showing a boot for a universal joint in accordance with a preferable second embodiment of the present invention together with the constant velocity joint 2 in a partly cutting manner.

FIG. 2 is a side view showing a boot for a universal joint in accordance with a preferable second embodiment of the present invention together with the constant velocity joint 2 in a partly cutting manner. The boot is structured such that a thickness $t_1$ of the rising wall 1a closest to the large-diameter attaching portion 2 in the bellows portion 1 is formed thinner than a thickness $t_2$ of the other portions (the root portions $12_1$ and $12_2$, the rising walls 1b to 1e constructing the inclined surfaces of the root portions $12_1$ and $12_2$, and the rising wall 1f closest to the small-diameter attaching portion 3) in the bellows portion 1. The other portions are structured in the same manner as FIG. 1.

Figure 3:
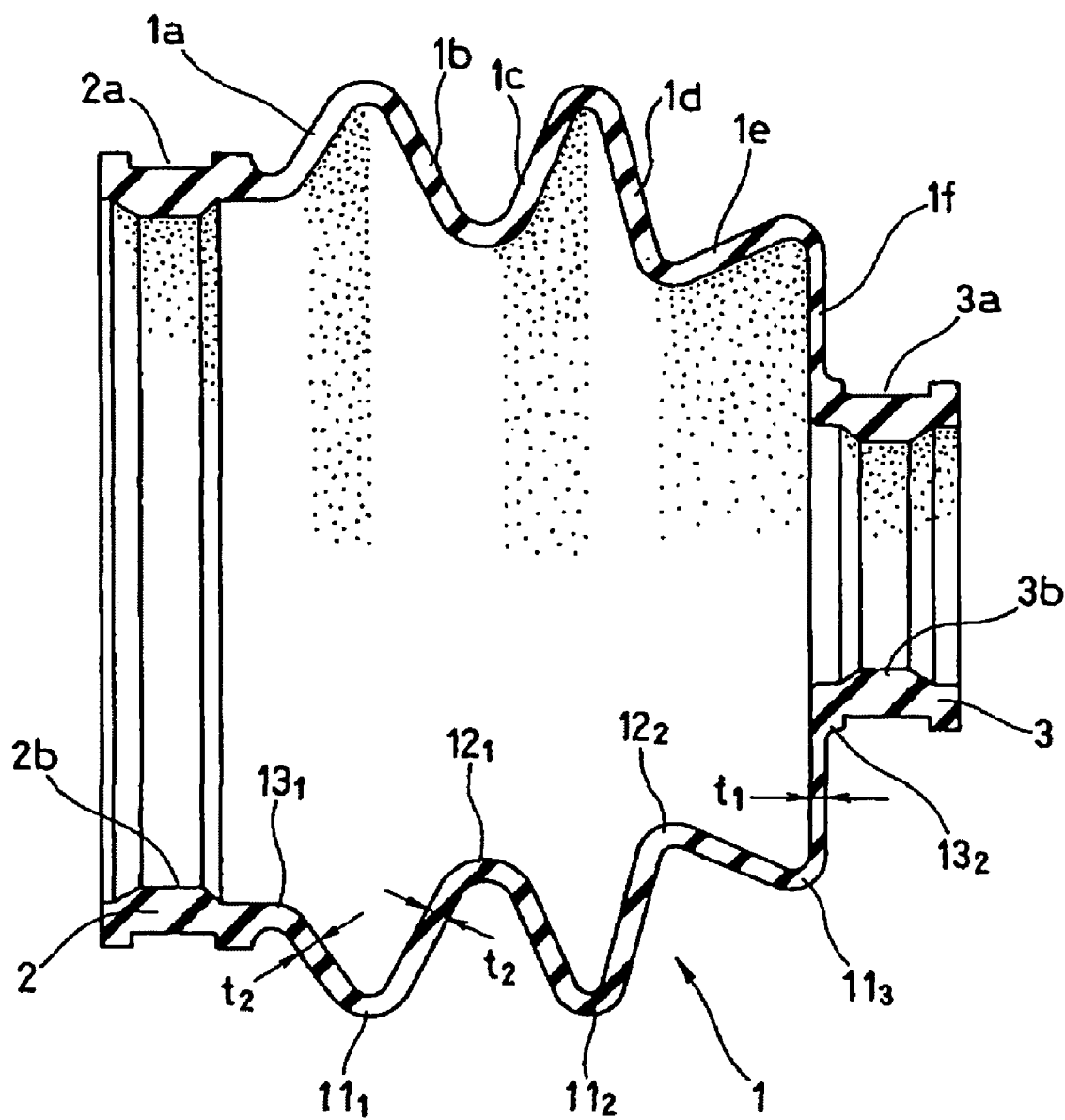
FIG. 3 is a side view showing a boot for a universal joint in accordance with a preferable third embodiment of the present invention together with the constant velocity joint 2 in a partly cutting manner.

Further, FIG. 3 is a side view showing a boot for a universal joint in accordance with a preferable third embodiment of the present invention together with the constant velocity joint 2 in a partly cutting manner. The boot is structured such that a thickness $t_1$ of the rising wall 1f closest to the small-diameter attaching portion 3 in the bellows portion 1 is formed thinner than a thickness $t_2$ of the other portions (the root portions $12_1$ and $12_2$, the rising walls 1b to 1e constructing the inclined surfaces of the root portions $12_1$ and $12_2$, and the rising wall 1a closest to the large-diameter attaching portion 2) in the bellows portion 1. The other portions are structured in the same manner as FIG. 1.

In the case of the boot for a universal joint in accordance with the second or third embodiment, there can be expected the effect that the increase of the contact force is restricted at a time when the crest portions $11_1$ to $11_3$ and the root portions $12_1$ and $12_2$ come into contact with each other at the side where the bellows 1 is compressed, and the increase of the rotational resistance in the steering operation is restricted.

Embodiment

Table 1 shows a result obtained by comparing a boot in accordance with an embodiment of the present invention structured such that the contact start angles between both sides of the root portion $12_1$ and both sides of the root portions $12_2$ at the compression side of the bellows portion 1 are the same as those shown in FIG. 1, at a time of enlarging the joint angle, with a boot in accordance with a comparative example in which the attaching shape, the attaching dimension and the set length are the same as those of the embodiment, but the thickness of the bellows portion 1 is made uniform (all set to $t_2$), $\theta_1$ is equal to $\theta_2$ and $\theta_3$ is equal to $\theta_4$. From this table 1, it is known that the contact start at the compression side is widely delayed in accordance with the boot of the present invention.

TABLE 1

| | Contact start angle (deg) | |
|---|---|---|
| | Comparative example | Embodiment |
| Root portion $12_1$ | 17.5 | 45 |
| Root portion $12_2$ | 22.5 | 45 |

Figure 4:
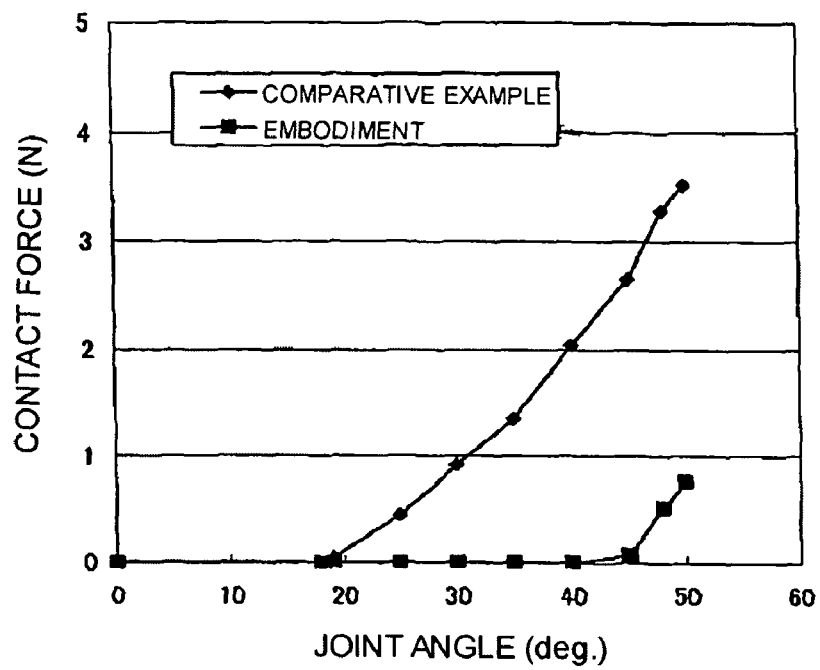
FIG. 4 is an explanatory view showing a relation between a joint angle and a contact force between both sides of a root portion $12_1$, which is obtained in accordance with an FEM, to compare an embodiment with a comparative example.
Figure 5:
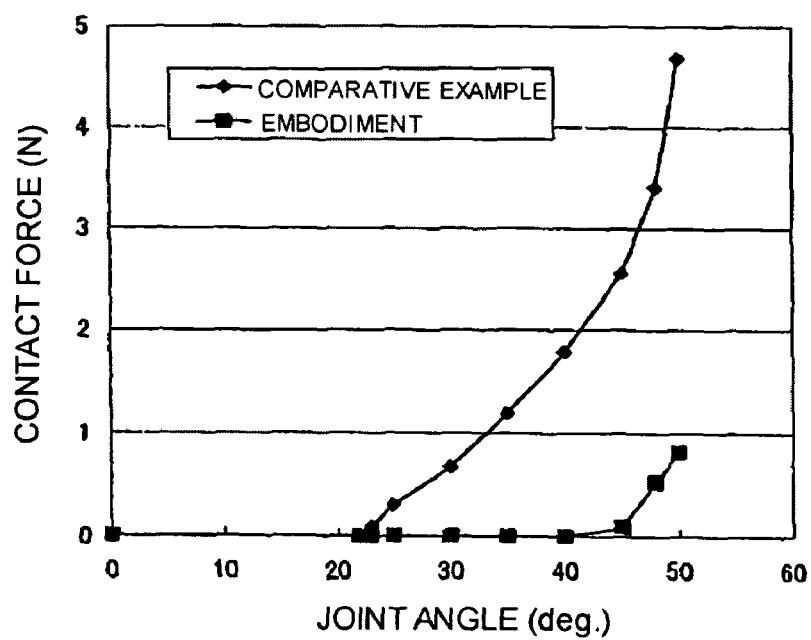
FIG. 5 is an explanatory view showing a result of conducting a relation between a joint angle and a contact force between both sides of a root portion $12_2$ in accordance with the FEM, to compare the embodiment with the comparative example.
Figure 6:
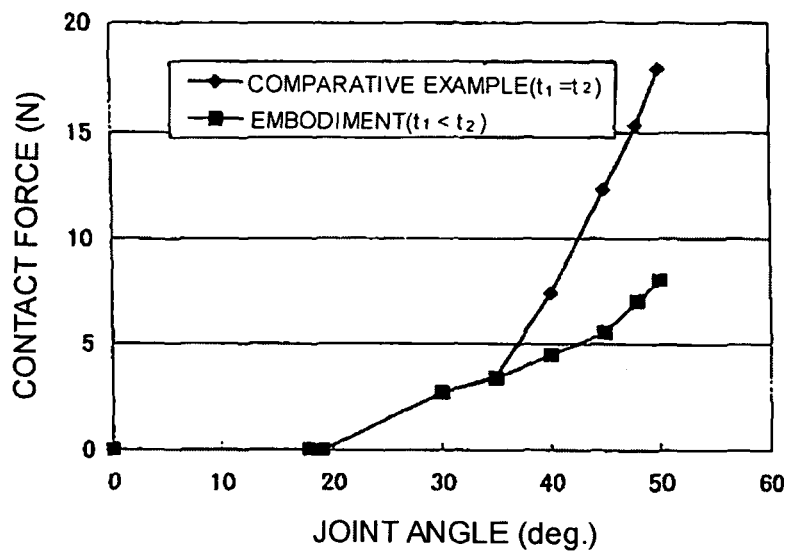
FIG. 6 is an explanatory view showing a relation between the joint angle and a sum of the contact forces applied to the bellows portion 1, to compare the embodiment with a boot in accordance with the comparative example ($t_1=t_2$) in which only the thickness of the bellows portion 1 is different from the embodiment.

Further, FIG. 4 is an explanatory view showing a result of conducting a relation between the joint angle and the contact force between both sides of the root portion $12_1$ in accordance with the FEM, to compare the boot in accordance with the embodiment with the boot in accordance with the comparative example, FIG. 5 is an explanatory view showing a relation between the joint angle and the contact force between both sides of the root portion $12_2$ to compare the boot in accordance with the embodiment with the boot in accordance with the comparative example, and FIG. 6 is an explanatory view showing a relation between the joint angle and the sum of the contact forces applied to the bellows portion 1 to compare the boot in accordance with the embodiment with the boot in accordance with the comparative example ($t_1=t_2$) in which only the thickness of the bellows portion 1 is different from the embodiment. As is apparent from these results, it is known that the increase of the contact force is small in the boot in accordance with the embodiment even if the joint angle becomes high.

Figure 7:
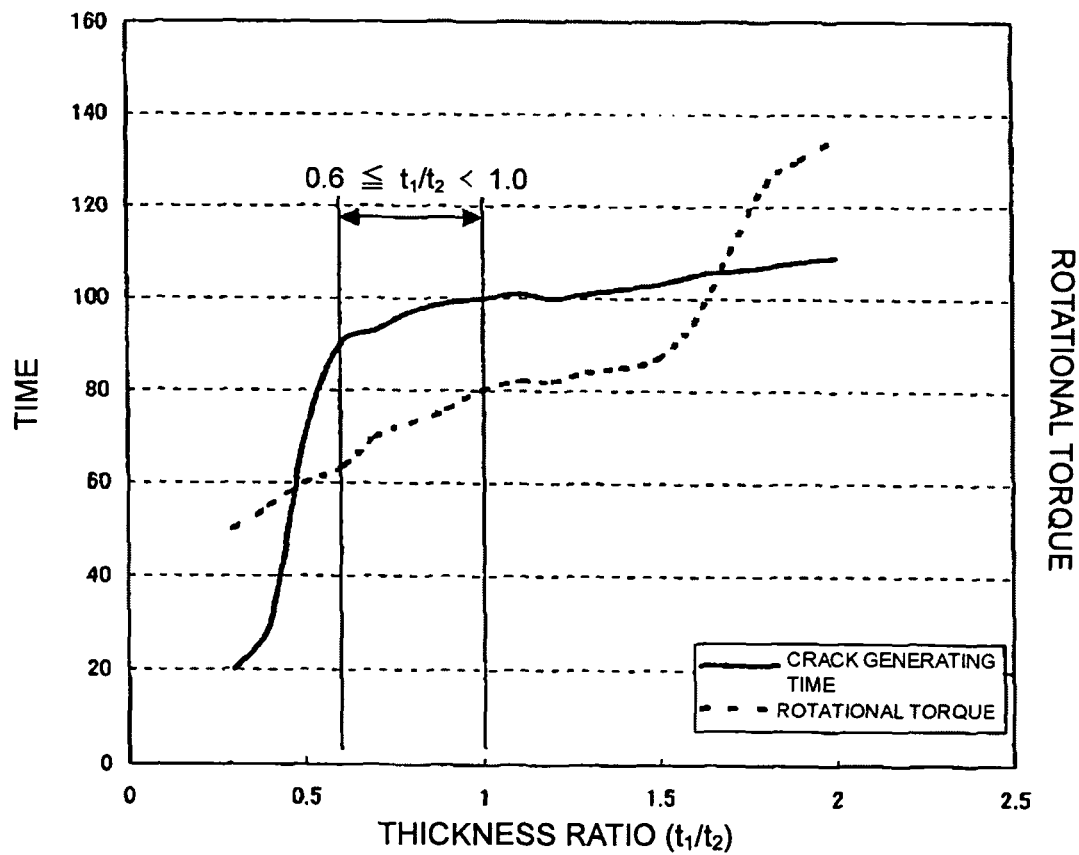
FIG. 7 is an explanatory view showing a measurement result of a crack generating time and a rotational torque at a time of variously changing the thickness ratio $t_1/t_2$ and rotating at the joint angle of 40 deg in a boot rotation durability test.

Further, FIG. 7 is an explanatory view showing a measurement result of a crack generating time (a lasting time) and rotational torque at a time of variously changing a thickness ratio $t_1/t_2$ between the thickness $t_1$ of the rising wall $1a$ closest to the large-diameter attaching portion 2 in the bellows portion 1 and the rising wall $1f$ closest to the small-diameter attaching portion 3, and the thickness $t_2$ of the other portions in the bellows portion 1, and rotating at the joint angle of 40 deg, in a boot rotation durability test.

As is apparent from FIG. 7, it is known that no large change is observed in the lasting time in the case that the thickness ratio is equal to or more than 0.6, but the durability is suddenly lowered in the case that the thickness ratio is less than 0.6. Further, it is known that the rotational torque is increased at an approximately fixed rate in accordance with the increase of the thickness ratio in the case that the thickness ratio is equal to or less than 1.5, but the torque is suddenly increased in the case that the thickness ratio is more than 1.5. Further, since it is effective to set the relation $t_1<t_2$ in order to restrict the increase of the contact force due to the compression of the bellows portion 1, as is described above, it is known that the thickness ratio $t_1/t_2$ should be preferably set to $0.6 \leq t_1/t_2 < 1.0$.

Industrial Applicability

In the boot for a universal joint in accordance with the present invention, since the increase of the contact force is restricted and the increase of the rotational resistance is restricted, even if the crest portions and the root portions of the bellows portion respectively come into contact with each other in accordance with the rotation, the boot can be utilized as the means for sealing a universal joint by being installed to the universal joint, for example, a constant velocity joint or the like used in a steering wheel of a motor vehicle.

What is claimed is:

1. A boot for a universal joint comprising:
    a bellows portion in which three or more crest portions extending in a circumferential direction and root portions therebetween are alternately formed;
    a large-diameter attaching portion formed at one end of the bellows portion; and
    a small-diameter attaching portion formed at the other end of said bellows portion,
    at least one of a rising wall closest to the large-diameter attaching portion in said bellows portion and a rising wall closest to the small-diameter attaching portion being formed thinner than the other portions in said bellows portion,
    an angle of inclination of the rising wall at the small-diameter attaching portion side of the crest portion closest to the large-diameter attaching portion being formed larger than an angle of inclination of the adjacent rising wall at the small-diameter attaching portion side, and
    an angle of inclination of the rising wall at the large-diameter attaching portion side of the crest portion closest to the small-diameter attaching portion being formed larger than an angle of inclination of the adjacent rising wall at the large-diameter attaching portion side.

2. The boot for a universal joint as claimed in claim 1, wherein a thickness ratio is set to $0.6 \leq t_1/t_2 < 1.0$, in which $t_1$ is thickness of the rising wall closest to the large-diameter attaching portion which is relatively thin, or thickness of the rising wall closest to the small-diameter attaching portion which is relatively thin, and $t_2$ is thickness of the other portions in the bellows portion.

3. A boot for a universal joint comprising:
    a bellows portion in which three or more crest portions extending in a circumferential direction and root portions therebetween are alternately formed;
    a large-diameter attaching portion formed at one end of the bellows portion;
    a small-diameter attaching portion formed at the other end of said bellows portion,
    at least one of a rising wall closest to the large-diameter attaching portion in said bellows portion and a rising wall closest to the small-diameter attaching portion being formed thinner than the other portions in said bellows portion,
    a pitch in an axial direction between the crest portion closest to the large-diameter attaching portion and a bottom portion at the large-diameter attaching portion side being formed smaller than a pitch in an axial direction between said crest portion closest to the large-diameter attaching portion and the adjacent root portion at the small-diameter attaching portion side, and
    a pitch in an axial direction between the crest portion closest to the small-diameter attaching portion and a bottom portion at the small-diameter attaching portion side being formed smaller than a pitch in an axial direction between said crest portion closest to the small-diameter attaching portion and the adjacent root portion at the large-diameter attaching portion side.

4. The boot for a universal joint as claimed in claim 3, wherein a thickness ratio is set to $0.6 \leq t_1/t_2 < 1.0$, in which $t_1$ is thickness of the rising wall closest to the large-diameter attaching portion which is relatively thin, or thickness of the rising wall closest to the small-diameter attaching portion which is relatively thin, and $t_2$ is thickness of the other portions in the bellows portion.

* * * * *